United States Patent
Hölzer

(10) Patent No.: US 11,346,350 B2
(45) Date of Patent: May 31, 2022

(54) VACUUM PUMP

(71) Applicant: Leybold GmbH, Cologne (DE)

(72) Inventor: Rainer Hölzer, Hürth (DE)

(73) Assignee: LEYBOLD GMBH, Cologne (DE)

( * ) Notice: Subject to any disclaimer, the term of this patent is extended or adjusted under 35 U.S.C. 154(b) by 0 days.

(21) Appl. No.: 16/969,629

(22) PCT Filed: Mar. 1, 2019

(86) PCT No.: PCT/EP2019/055205
§ 371 (c)(1),
(2) Date: Aug. 13, 2020

(87) PCT Pub. No.: WO2019/170555
PCT Pub. Date: Sep. 12, 2019

(65) Prior Publication Data
US 2020/0400147 A1  Dec. 24, 2020

(30) Foreign Application Priority Data

Mar. 6, 2018 (DE) .................... 20 2018 001 170.3

(51) Int. Cl.
*F04D 19/04* (2006.01)
*F04D 29/18* (2006.01)
(Continued)

(52) U.S. Cl.
CPC ......... *F04D 19/042* (2013.01); *F04D 29/056* (2013.01); *F04D 29/18* (2013.01); *F04D 29/668* (2013.01); *F16C 27/04* (2013.01)

(58) Field of Classification Search
CPC .... F04D 19/042; F04D 29/056; F04D 29/059; F04D 29/18; F04D 29/552; F04D 29/668; F16C 27/04; F16C 27/045; F16C 27/066
See application file for complete search history.

(56) References Cited

U.S. PATENT DOCUMENTS 4,872,767 A * 10/1989 Knapp ................. F16C 33/586
384/99
5,290,973 A * 3/1994 Kwoh ..................... F16F 9/006
181/199

(Continued)

FOREIGN PATENT DOCUMENTS

CN  101189436 A  5/2008
CN  101243262 A  8/2008
(Continued)

OTHER PUBLICATIONS

Chinese Office Action dated Apr. 27, 2021 for Chinese Appl. No. 2019800153493.

(Continued)

*Primary Examiner* — Richard A Edgar
*Assistant Examiner* — Jason G Davis
(74) *Attorney, Agent, or Firm* — Ohlandt, Greeley, Ruggiero and Perle, LLP

(57) ABSTRACT

A vacuum pump comprises stator elements in a pump housing. The stator elements cooperate with rotor elements. The rotor elements are held by a rotor shaft, wherein the rotor shaft is mounted in the pump housing via bearing elements. The bearing element is surrounded by a supporting element, wherein the supporting element comprises an inner portion, an outer portion and a plurality of spring arms connecting the inner portion (28) to the outer portion. Each spring arm comprises at least one hollow space.

9 Claims, 2 Drawing Sheets

(51) Int. Cl.
*F04D 29/66* (2006.01)
*F04D 29/056* (2006.01)
*F16C 27/04* (2006.01)

(56) References Cited

U.S. PATENT DOCUMENTS

| | | | |
|---|---|---|---|
| 5,425,584 A * | 6/1995 | Ide | F01D 25/164 |
| | | | 384/99 |
| 8,186,937 B2 * | 5/2012 | Brewster | F04D 19/04 |
| | | | 415/90 |
| 8,662,841 B2 * | 3/2014 | Tollner | F04D 29/056 |
| | | | 415/229 |
| 10,400,777 B2 * | 9/2019 | Rudge | F16C 3/02 |
| 10,697,461 B2 * | 6/2020 | Rudge | F04D 19/044 |
| 2007/0012530 A1 * | 1/2007 | Garcia | F16C 35/077 |
| | | | 188/268 |
| 2008/0152483 A1 | 6/2008 | Godleski | |
| 2009/0263057 A1 | 10/2009 | Kanki | |

FOREIGN PATENT DOCUMENTS

| | | |
|---|---|---|
| CN | 101517241 A | 8/2009 |
| EP | 1925833 A1 | 5/2008 |
| JP | 2010203504 A | 9/2010 |
| WO | 2006131694 A1 | 12/2003 |

OTHER PUBLICATIONS

International Search Report dated May 2, 2019 for PCT application No. PCT/EP2019/055205; 5pgs.
Written Opinion dated May 2, 2019 for PCT application No. PCT/EP2019/055205; 8pgs.

* cited by examiner

VACUUM PUMP

BACKGROUND

1. Field of the Disclosure

The disclosure relates to a vacuum pump.

2. Discussion of the Background Art

A vacuum pump, such as a turbomolecular pump, comprises, in a pump housing, a stator element including a plurality of stator disks. Further, a rotor element comprising a plurality of rotor disks is provided, wherein the stator disks and the rotor disks are alternately arranged with respect to each other in an axial direction or feeding direction. The rotor element comprising the rotor disks is held by a rotor shaft. The rotor shaft is held by bearing elements which are indirectly or directly arranged in the pump housing. In other vacuum pump types, such as screw pumps, the rotor elements are constituted of two screw rotors, wherein each screw rotor is mounted in the pump housing via a rotor shaft. Here, the stator element configured by the pump housing or the configuration of the bore or opening of the pump housing where in screw rotors are arranged. The same applies to Roots pumps, claw pumps and the like.

Frequently, the rotor shaft is mounted via magnetic bearings and/or roller bearings. In the case of roller bearings it is known that they not directly arranged in the pump housing but that a supporting element, such as a vibration ring, is provided between an outer race of the roller bearing and the pump housing. Depending on the configuration, such a supporting element absorbs and/or dampens radial and/or axial forces.

A specially configured supporting element is known from EP 2064448. This supporting element comprises an annular inner portion and an annular outer portion. The inner portion and the outer portion are connected to each other via spring arms, wherein the inner portion, the outer portion and the spring arms are integrally formed with each other. In the supporting element known from EP 2064448, the spring arms are configured such that in a disk-shaped element circumferentially extending slots are provided. This allows for a movement of the annular inner portion relative to the annular outer portion. However, in the supporting element known from EP 2064448 it is disadvantageous that said element has only very low damping characteristics. This is in particular attributable to the fact that the characteristics of this supporting element change due to temperature changes and the influence of chemical substances of the environment. Further, radial movements of the bearing outer race of the rolling bearing are inadequately transmitted since the spring arms are subject to friction. Here, the friction behavior varies to a very large extent.

It is an object of the disclosure to suggest a vacuum pump, in particular a turbomolecular pump, where a supporting element is provided which realizes an improved damping of a bearing element.

SUMMARY

A vacuum pump comprises a pump housing where stator elements are arranged or which constitutes the stator element. At least one rotor element cooperates with the at least one stator element. Depending on the vacuum pump type, the stator elements and the rotor elements are of different configurations. In the case of a turbomolecular pump, the stator element comprises a plurality of stator disks which cooperate with a plurality of rotor disks. In a similar manner, in the case of a screw pump, screw rotors cooperate with the corresponding bore and/or recess in the housing, wherein the inside of the housing constitutes the stator element. The same applies to Roots or claw pumps. The rotor elements are held by at least one rotor shaft. The at least one rotor shaft is arranged in the pump housing and is held by bearing elements arranged therein. The bearing elements can in particular be magnetic or rolling bearings. In the case of rolling bearings, it is advantageous not to arrange them directly in the pump housing but to provide a supporting element between the rolling bearing, in particular at the outer race of the rolling bearing, below the pump housing.

According to the disclosure, the supporting element comprises an inner portion and an outer portion. Here, the inner portion is connected to the bearing element, wherein the inner portion may also constitute the outer race of the roller bearing. The outer portion is connected to the pump housing. For connecting the inner portion to the outer portion, in particular a plurality of spring arms are provided. According to a particularly preferred embodiment, the spring arms are connected to or formed integrally with the inner portion and/or the outer portion. According to the disclosure, for improving the damping characteristics it is provided that the spring arms each comprise at least one hollow space. Thereby, the spring arms can be easily deformed such that the damping characteristics are improved.

According to a particularly preferred embodiment, a damping material is arranged in the at least one hollow space. The hollow space filled with damping material can be filled with a damping material of different characteristics, quantities etc. for changing the damping characteristics.

It is particularly preferred to provide powder as the damping material. Particularly preferably, a compound of fine solid particles is used as a powder, which particles do not clump together or conglomerate under the operating conditions.

According to a particularly preferred embodiment, the at least one hollow space per spring arm is completely enclosed. This ensures that the damping material is not pressed out of the hollow space, whereby the damping characteristics would be changed. Further, the loss of damping material is avoided. This is in particular advantageous if a negative pressure prevails in the region of the supporting element. Here, the hollow spaces provided in the spring arms can be closed by a cover. It is preferred that a manufacturing process is selected in the course of which the hollow spaces are closed. For example, the supporting element can be cast, wherein the hollow spaces are realized by lost cores. Preferably, the supporting elements are manufactured by 3D printing, wherein it is possible to provide the corresponding powder in the hollow spaces and to form the hollow spaces during printing. Here, a metallic 3D printing is particularly preferred.

Preferably, the at least one hollow space or the plurality of hollow spaces per spring arm account for at least 5% of the volume of the respective spring arm. Thereby, it is possible to define the damping characteristics of the spring arms in particular depending on the damping material used.

According to a particularly preferred embodiment of the disclosure, the individual spring arms are configured as annular segments or helical segments. The spring arms thus form part of a ring or a helix. In particular, the spring arms configured as annular segments or helical segments extend by an angle of more than 90°, in particular more than 180° and particularly preferably by more than 270°. In addition, it is preferred that a plurality of spring arms at least partially overlap each other in a radial direction of the supporting element, i.e. in a radial direction of the rotor shaft. Further, overlapping in the circumferential direction is preferred in particular in the case of spring arms configured as annular segments or helical segments for obtaining a good damping characteristic.

It is particularly preferred that all spring arms are fixedly connected to the inner portion and/or the outer portion. In particular, it is preferred that the spring arms, the inner portion and the outer portion are integrally formed.

In addition, the disclosure relates to a supporting element for a bearing element, such as a rolling bearing of a rotor shaft of a vacuum pump. As stated above, according to the disclosure, the supporting element is configured such that it comprises an inner portion and an outer portion, wherein the inner portion is adapted to be indirectly or directly connected to the bearing element and the outer portion is adapted to be indirectly or directly connected to the housing. The inner portion is connected to the outer portion via a plurality of spring arms, wherein each spring arms comprises at least one hollow space. The supporting element is configured as described above with reference to the vacuum pump and is in particular further developed in an advantageous manner.

BRIEF DESCRIPTION OF THE DRAWINGS

The disclosure will be explained in detail on the basis of a preferred embodiment with reference to the accompanying drawings in which.

DETAILED DESCRIPTION OF THE PREFERRED EMBODIMENT

Figure 1:
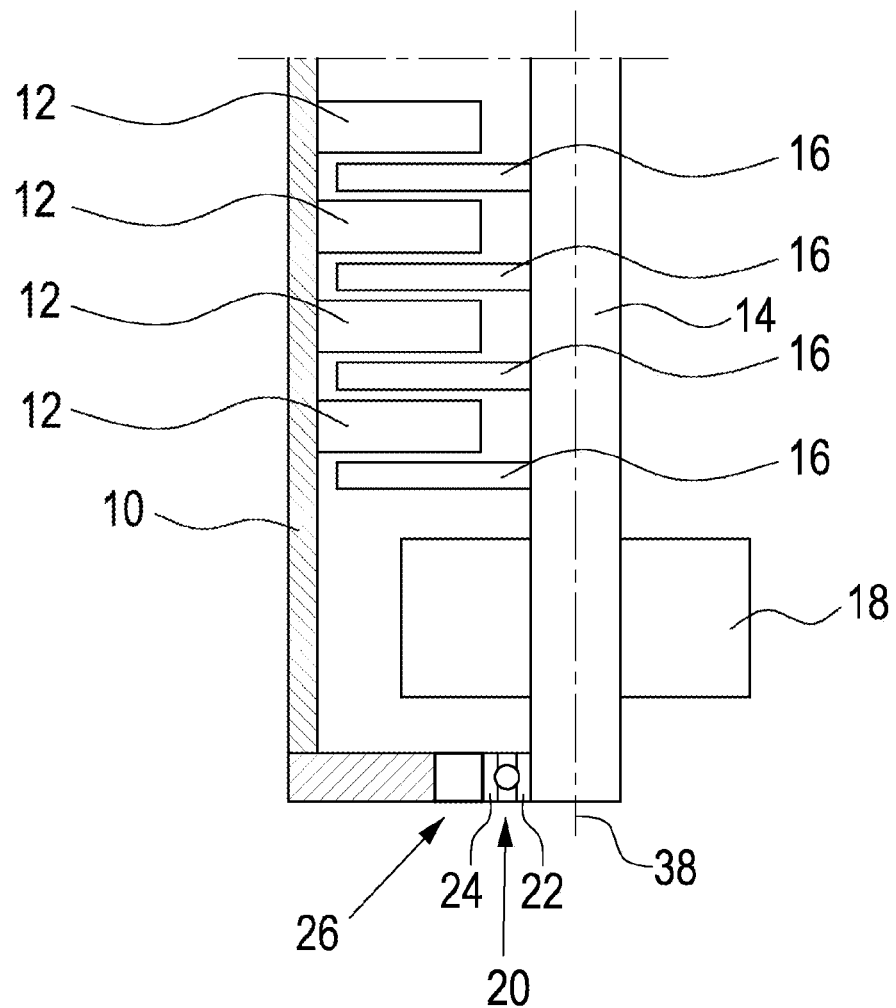
FIG. 1 shows a highly simplified schematic view of a portion of a turbomolecular pump.

In the highly simplified sectional view in FIG. 1, a turbomolecular pump is illustrated as a vacuum pump. The pump comprises a pump housing 10.

The pump housing 10 holds a stator element which, in the illustrated exemplary embodiment, comprises a plurality of stator disks 12. Further, in the pump housing 10, a rotor shaft 14 is arranged which holds a rotor element 16. In the illustrated exemplary embodiment, said rotor shaft comprises a plurality of rotor disks 16. The rotor shaft 14 is driven via a schematically illustrated electric motor 18. The rotor shaft 14 is mounted in a cover of the housing 10 via a bearing 20. On the opposite side, at the inlet of the vacuum pump, another rolling bearing or a bearing element may be provided.

An inner race 22 of the rolling bearing 20 is connected to the rotor shaft 14. An outer race 24 of the rolling bearing 20 is connected to a supporting element 26.

Figure 2:
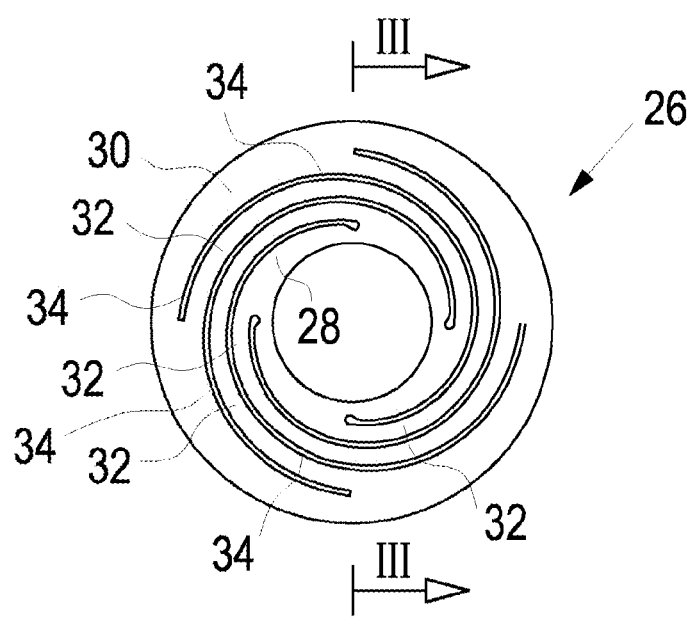
FIG. 2 shows a schematic top view of a supporting element.

The supporting element 26 (FIGS. 2 and 3) comprises an inner portion 28 and an outer portion 30. In the illustrated exemplary embodiment, the inner portion 28 is connected to the outer portion 30 via four spring arms 32. In the illustrated exemplary embodiment, the overall supporting element 26 is of an integral configuration.

Figure 3:
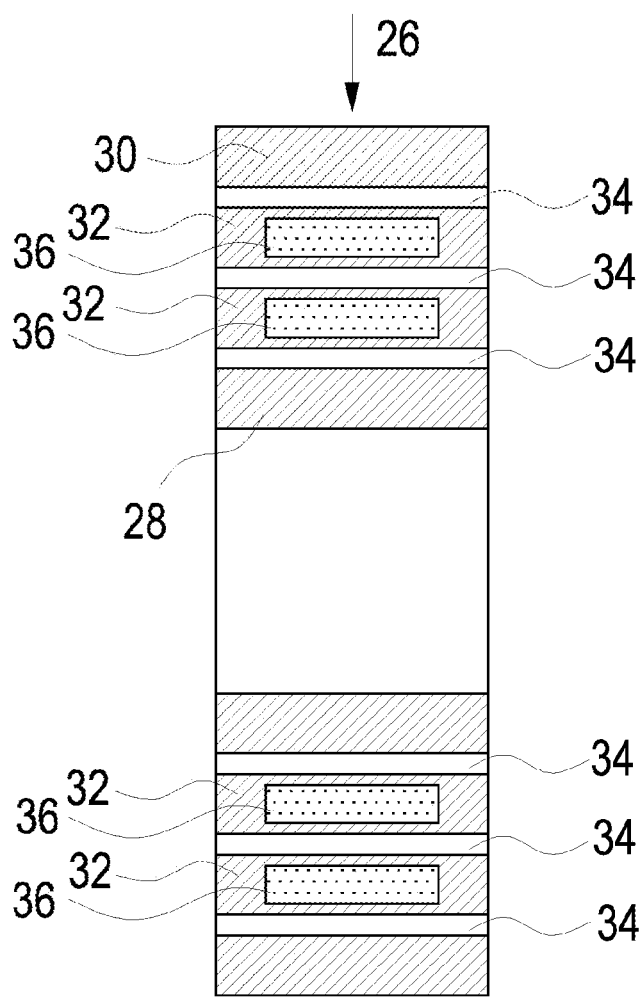
FIG. 3 shows a schematic sectional view along a line III-III in FIG. 2.

The spring arms 32 configured as helical segments are separated from each other by slots 34. The slots 34 extend over the overall thickness of the supporting element 26 (FIG. 3).

In each spring arm 32 a hollow space 36 is provided, wherein a plurality of hollow spaces 36 can be provided in each spring arm 32. The hollow spaces 36 are filled with a powder for defining the damping characteristics.

The supporting element according to the disclosure allows for damping axial and radial forces occurring relative to an axis of rotation 38 (FIG. 1).

What is claimed is:

1. A vacuum pump, comprising:
   a stator element arranged in a pump housing;
   a rotor element cooperating with the stator element;
   a rotor shaft holding the rotor element;
   bearing elements arranged in the pump housing and holding the rotor shaft;
   at least one supporting element surrounding at least one of the bearing elements; and
   wherein each supporting element has an inner portion connected to the bearing element and an outer portion connected to the pump housing;
   wherein each supporting element comprises a plurality of spring arms connecting the inner portion to the outer portion;
   wherein the plurality of spring arms are separated from each other by a slot;
   wherein each spring arm comprises at least one hollow space within each spring arm; and
   wherein the at least one hollow space is completely enclosed.

2. The vacuum pump according to claim 1, wherein the at least one hollow space is filled with a damping material.

3. The vacuum pump according to claim 2, wherein the damping material is a powdery material.

4. The vacuum pump according to claim 1, wherein, for each said spring arm, the at least one hollow space or a plurality of hollow spaces jointly account for at least 5% of the volume per spring arm.

5. The vacuum pump according to claim 1, wherein the spring arms are configured as annular segments or helical segments.

6. The vacuum pump according to claim 1, wherein a plurality of said spring arms at least partially overlap each other in a radial direction of the supporting element.

7. The vacuum pump according to claim 1, wherein all said spring arms are fixedly connected to the inner portion and/or the outer portion.

8. The vacuum pump according to claim 1, wherein the spring arms, the inner portion and the outer portion are integrally formed.

9. A supporting element for a bearing element of a rotor shaft of
   a vacuum pump, comprising:
   an inner portion adapted to be connected to the bearing element;
   an outer portion adapted to be connected to a pump housing;
   a plurality of spring arms connecting the inner portion to the outer portion;
   wherein the plurality of spring arms are separated from each other by a slot;
   wherein each said spring arm comprises at least one hollow space within each spring arm; and
   wherein the at least one hollow space is completely enclosed.

* * * * *